US012500380B2

(12) United States Patent
He et al.

(10) Patent No.: US 12,500,380 B2
(45) Date of Patent: Dec. 16, 2025

(54) CABLE ASSEMBLY FOR ELECTRICAL CONNECTOR

(71) Applicant: LOTES CO., LTD, Keelung (TW)

(72) Inventors: Zhi Li He, Keelung (TW); Wen Chang Chang, Keelung (TW)

(73) Assignee: Lotes Co., Ltd, Keelung (TW)

( * ) Notice: Subject to any disclaimer, the term of this patent is extended or adjusted under 35 U.S.C. 154(b) by 367 days.

(21) Appl. No.: 18/112,575

(22) Filed: Feb. 22, 2023

(65) Prior Publication Data

US 2023/0283020 A1 Sep. 7, 2023

(30) Foreign Application Priority Data

Mar. 4, 2022 (CN) ........................ 202210208280.X

(51) Int. Cl.
*H01R 13/6581* (2011.01)
*H01R 13/6461* (2011.01)

(52) U.S. Cl.
CPC ..... *H01R 13/6581* (2013.01); *H01R 13/6461* (2013.01)

(58) Field of Classification Search
CPC ........................ H01R 13/6581; H01R 13/6461
USPC ...................................................... 439/607.55
See application file for complete search history.

(56) References Cited

U.S. PATENT DOCUMENTS 5,683,269 A * 11/1997 Davis ................. H01R 13/6593 439/607.5
5,941,733 A * 8/1999 Lai ....................... H01R 13/582 439/906
6,203,369 B1 * 3/2001 Feldman ................ H01R 24/40 439/579
6,524,135 B1 * 2/2003 Feldman .............. H01R 9/0512 439/701
7,004,793 B2 * 2/2006 Scherer .............. H01R 13/6592 439/607.11

(Continued)

FOREIGN PATENT DOCUMENTS

CN 101494336 B 3/2013
CN 104009307 B 8/2016

(Continued)

*Primary Examiner* — Peter G Leigh

(74) *Attorney, Agent, or Firm* — Troutman Pepper Locke LLP; Tim Tingkang Xia, Esq.

(57) ABSTRACT

An electrical connector includes at least one electrical module, which includes an insulating body and a plurality of transmission modules. Each transmission module includes a terminal assembly and a cable assembly. Each terminal assembly includes two terminals and a shielding shell. Each terminal has a contact portion, a wire connecting portion and an intermediate portion. A first shielding portion of the shielding shell is provided outside the two wire connecting portions of the two terminals, and the first shielding portion is provided with an open area exposing the two wire connecting portions. A conductive sheet is electrically connected to the shielding shells of the terminal assemblies in a same row. The conductive sheet shields the open areas of the shielding shells in the same row. Each first shielding portion and the conductive sheet collectively form a shielding space and are surroundingly provided outside the two corresponding wire connecting portions.

19 Claims, 12 Drawing Sheets

(56) References Cited

U.S. PATENT DOCUMENTS

| | | | | | |
|---|---|---|---|---|---|
| 7,553,187 | B2 * | 6/2009 | Feldman | H01R 13/506 | 439/607.17 |
| 7,744,414 | B2 * | 6/2010 | Scherer | H01R 13/518 | 439/607.1 |
| 7,850,489 | B1 * | 12/2010 | Feldman | H01R 13/518 | 439/607.1 |
| 8,449,329 | B1 * | 5/2013 | Schroll | H01R 13/6586 | 439/607.05 |
| 8,449,330 | B1 * | 5/2013 | Schroll | H01R 13/514 | 439/607.06 |
| 8,888,533 | B2 * | 11/2014 | Westman | H01R 13/6586 | 439/626 |
| 9,071,001 | B2 * | 6/2015 | Scherer | H01R 13/516 | |
| 9,240,638 | B2 * | 1/2016 | Peloza | H01R 12/52 | |
| 9,401,563 | B2 * | 7/2016 | Simpson | H01R 13/5841 | |
| 9,455,534 | B2 * | 9/2016 | Resendez | H01R 13/658 | |
| 9,711,912 | B2 * | 7/2017 | Xing | H01R 13/659 | |
| 9,865,977 | B2 * | 1/2018 | Resendez | H01R 13/658 | |
| 10,038,282 | B2 * | 7/2018 | De Geest | H01R 13/6594 | |
| 10,699,823 | B2 * | 6/2020 | Blackburn | H04B 3/30 | |
| 11,217,944 | B2 * | 1/2022 | Trout | H01R 13/428 | |
| 2008/0124974 | A1 * | 5/2008 | Barr | H01R 24/568 | 439/604 |
| 2009/0149065 | A1 * | 6/2009 | Pan | H01R 12/00 | 439/607.13 |
| 2009/0176400 | A1 * | 7/2009 | Davis | H01R 13/506 | 439/352 |
| 2010/0009571 | A1 * | 1/2010 | Scherer | H01R 13/518 | 439/607.05 |
| 2010/0041273 | A1 * | 2/2010 | Scherer | H01R 13/6597 | 439/607.01 |
| 2010/0144201 | A1 * | 6/2010 | Defibaugh | H01R 13/514 | 439/607.05 |
| 2013/0149899 | A1 * | 6/2013 | Schroll | H01R 13/6593 | 439/607.01 |
| 2013/0196555 | A1 * | 8/2013 | Scherer | H01R 13/6463 | 439/686 |
| 2014/0051295 | A1 * | 2/2014 | Westman | H01R 13/518 | 439/626 |
| 2014/0349523 | A1 * | 11/2014 | Peng | H01R 13/6593 | 439/701 |
| 2020/0005966 | A1 * | 1/2020 | Blackburn | H01B 11/002 | |
| 2023/0283020 | A1 | 9/2023 | He et al. | | |

FOREIGN PATENT DOCUMENTS

| | | | | | |
|---|---|---|---|---|---|
| CN | 103563179 | B | | 9/2016 | |
| CN | 103975488 | B | | 10/2016 | |
| CN | 107077926 | A | * | 8/2017 | H01B 11/1008 |
| CN | 104718666 | B | | 8/2018 | |
| CN | 107240852 | B | | 7/2019 | |
| CN | 105470732 | B | | 10/2019 | |
| CN | 107257038 | B | | 4/2020 | |
| CN | 107077926 | B | | 7/2020 | |
| CN | 111864476 | A | | 10/2020 | |
| CN | 113036541 | A | | 6/2021 | |
| CN | 113555714 | A | | 10/2021 | |
| CN | 215600605 | U | | 1/2022 | |
| EP | 670616 | A1 | * | 9/1995 | H01R 13/6586 |
| EP | 2194615 | A1 | * | 6/2010 | H01R 12/585 |
| JP | 3415889 | B2 | * | 6/2003 | H01R 13/6583 |
| JP | 2004103527 | A | * | 4/2004 | |
| WO | WO-2010005758 | A2 | * | 1/2010 | H01R 13/518 |

* cited by examiner

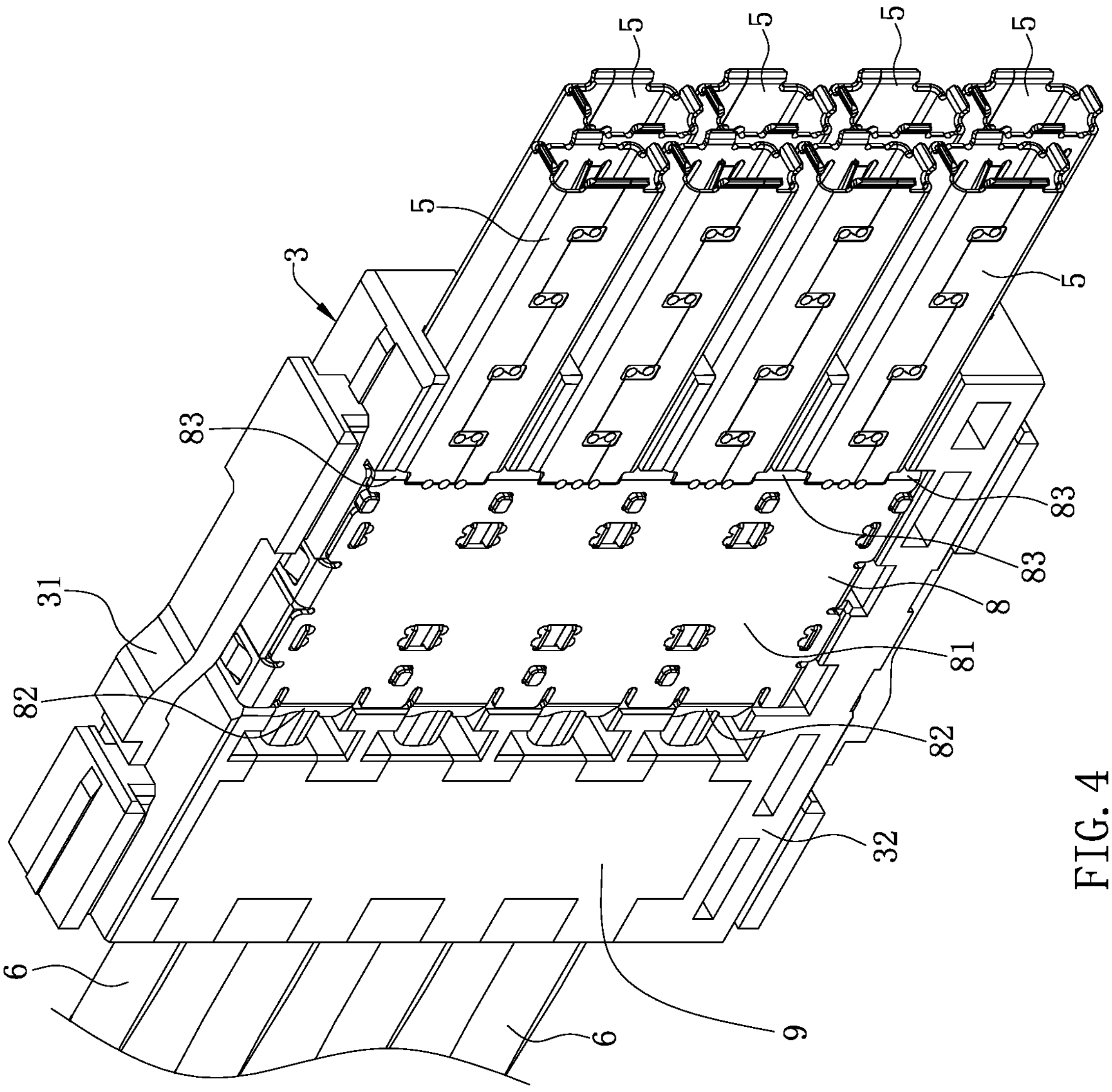
FIG. 4
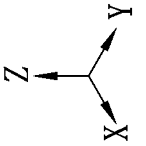
2

A-A

CABLE ASSEMBLY FOR ELECTRICAL CONNECTOR

CROSS-REFERENCE TO RELATED PATENT APPLICATION

This non-provisional application claims priority to and the benefit of, pursuant to 35 U.S.C. § 119(a), patent application Serial No. CN202210208280.X filed in China on Mar. 4, 2022. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector, and particularly to an electrical connector that reduces crosstalk interference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An existing electrical connector, such as the one in Chinese Patent No. CN200910126715.0, includes a plurality of terminal modules. Each terminal module includes a plurality of conductors and a body fixing the conductors. The conductors have wire ends soldered to the wires of a cable. The body includes a frame component and insertion portions, and the insertion portions are molded onto the wire ends and the wires. In the electrical connector, to solder the wires and the wire ends, the wire ends of the conductors are extended out of the frame component, thus not being shielded by common components. However, in the signal transmission process, since the wires and the conductors are all transmitting currents, the electrical magnetic field around the wire ends are denser than other locations, such that the wire ends are more easily interfered by other signals, and the electrical connector is affected by crosstalk.

Therefore, a heretofore unaddressed need to design a new electrical connector exists in the art to address the aforementioned deficiencies and inadequacies.

SUMMARY

The present invention is directed to an electrical connector, which is convenient for connecting the wire connecting portions and the wires through the open area and shields the open area through the conductive sheet, and the shielding space collectively formed by the first shielding portion and the conductive sheet provides good shielding to the wire connecting portions of the terminals, thus reducing the crosstalk interference to the terminals. Meanwhile, the conductive sheet connects the shielding shells in the same row to form an integral grounding structure, such that electrical potentials of the conductive sheet and the shielding shells are equal, and the grounding current paths are increased, further reducing the signal crosstalk and enhancing the shielding grounding effect.

To achieve the foregoing objective, the present invention adopts the following technical solutions. An electrical connector includes at least one electrical module. The electrical module includes: an insulating body; a plurality of transmission modules, arranged in at least one row along a first direction, wherein each of the transmission modules comprises a terminal assembly fixed to the insulating body and a cable assembly connected to the terminal assembly, the terminal assembly comprises two terminals arranged side-by-side and a shielding shell surrounding outside the two terminals, the shielding shell and the two terminals are electrically isolated, each of the terminals has a contact portion configured to mate with a mating connector, a wire connecting portion configured to be connected to a wire of the corresponding cable assembly and an intermediate portion connecting the contact portion and the wire connecting portion, a first shielding portion of the shielding shell is provided outside the two wire connecting portions of the two terminals, and the first shielding portion is provided with an open area exposing the two wire connecting portions; and a conductive sheet, fixed to the insulating body and electrically connected to the shielding shells of the terminal assemblies of the transmission modules in a same row, wherein the conductive sheet shields the open areas of the shielding shells of the terminal assemblies of the transmission modules in the same row, and the first shielding portion of each of the shielding shells of the terminal assemblies and the conductive sheet collectively form a shielding space and are surroundingly provided outside the two corresponding wire connecting portions of the two terminals.

In certain embodiments, the terminal assembly of each of the transmission modules further comprises an insulating block fixing the two terminals, the insulating block insulates and isolates the two terminals and the shielding shell, the insulating block is provided with an air slot at locations of the wire connecting portions, and the wire connecting portions of the two terminals are isolated from each other through air.

In certain embodiments, each of the terminals further comprises a tail portion extending from the wire connecting portion, the insulating block is further provided with an isolation block, and the isolation block is located between the two tail portions of the two terminals of the terminal assembly and is located between the two wires connected to the two terminals of the terminal assembly.

In certain embodiments, the cable assembly of each of the transmission modules comprises two wires, an insulating layer covering the wires and a shielding layer covering outside the insulating layer, the cable assembly of each of the transmission modules further comprises a grounding ring, and the grounding ring is sleeved on and in contact with the shielding layer of the cable assembly; the first shielding portion extends to be in contact with the grounding ring, and the shielding space is surroundingly provided outside the wire connecting portion and outside a portion of the grounding ring.

In certain embodiments, the first shielding portion comprises a first wall and a second wall provided opposite to each other and a third wall connected between the first wall and the second wall, the third wall and the open area are provided opposite to each other, the first wall and the second wall bend and extend toward the grounding ring to form a shielding contact arm in contact with the grounding ring, an edge of the shielding contact arm is connected to the third wall, the third wall is in contact with the grounding ring, and a portion of the conductive sheet is in contact with the grounding ring.

In certain embodiments, the conductive sheet has a main body portion and a plurality of abutting portions extending toward the grounding rings of the cable assemblies of the transmission modules in the same row from the main body portion, the main body portion shields the open areas of the shielding shells of the terminal assemblies of the transmission modules in the same row, an air gap exists between the main body portion and the grounding ring, a tail end of each of the abutting portions extends obliquely and is in contact with the corresponding grounding ring, a middle portion of the tail end of each of the abutting portions is provided with a recess, and a maximum width of the recess is less than a width of the grounding ring.

In certain embodiments, the shielding shell further comprises a second shielding portion integrally connected to the first shielding portion, the second shielding portion comprises four side walls and is surroundingly provided at outer sides of the contact portions of the two terminals, and the conductive sheet is limited by at least one of the side walls of the second shielding portion along an extending direction of the contact portion.

In certain embodiments, the transmission modules comprise a plurality of first transmission modules arranged in a first row along the first direction and a plurality of second transmission modules arranged in a second row along the first direction, and the first row and the second row are parallel along a second direction perpendicular to the first direction; the insulating body is provided with an extending portion fixing the cable assemblies of the transmission modules, the extending portion is provided with a first filling space at a location corresponding to the cable assemblies of the first transmission modules, the extending portion is provided with a second filling space at a location corresponding to the cable assemblies of the second transmission modules, and the extending portion is further provided with at least one hole in communication with the first filling space and the second filling space; and the electrical module further comprises an insulating material being integrally formed and filled in the first filling space, the hole and the second filling space, and the insulating material and the extending portion collectively fix the cable assemblies of the transmission modules in the first row and the second row.

In certain embodiments, the first filling space comprises a plurality of first slots accommodating the cable assemblies of the first transmission modules in the first row, the second filling space comprises a plurality of second slots accommodating the cable assemblies of the second transmission modules in the second row, the extending portion is provided with separation portions between two adjacent ones of the first slots and between two adjacent ones of the second slots; and projections of the first slots and the second slots along the second direction are staggered to each other, and the hole is located on the separation portions and runs through the separation portions.

In certain embodiments, the terminal assembly of each of the transmission modules further comprises an insulating block fixing the two terminals, the insulating block is located in the shielding shell and insulates and isolates the two terminals and the shielding shell, the insulating block is provided with at least one first position limiting slot, the shielding shell is provided with at least one second position limiting slot, and the second position limiting slot corresponds to a location of a corresponding first position limiting slot of the at least one first position limiting slot and exposes the corresponding first position limiting slot; and the conductive sheet has a main body portion and a plurality of position limiting portions extending from the main body portion, the main body portion shields the open areas of the shielding shells of the terminal assemblies of the transmission modules in the same row, and each of the position limiting portions enters the second position limiting slot of at least one of the shielding shells and the first position limiting slot corresponding to the second position limiting slot.

Compared with the related art, the electrical connector according to certain embodiments of the present invention has the following beneficial effects. The open areas allow the wires to be connected to the wire connecting portions, and the conductive sheet shields the open areas, thus preventing outer interference signals from transmitting to the wire connecting portions through the open areas, and shielding the interference signals for the wire connecting portions through the shielding space. Further, the conductive sheet connects the shielding shells in the same row to form an integral grounding structure, such that electrical potentials of the conductive sheet and the shielding shells are equal, thus reducing the signal crosstalk, and the grounding current paths are increased, which may transmit the interference signals received out rapidly, thus enhancing the shielding grounding effect. Further, compared to the case where the shielding space is surroundingly formed by assembling two separate portions of the first shielding portion, and then connecting the shielding shells through the conductive sheet, the present invention does not require forming the shielding space by assembling two separate portions of the first shielding portion, thus fully utilizing the shielding area of the conductive sheet, and reducing the material usage of the shielding shells, thereby reducing the cost of the electrical connector.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 4 is a perspective assembled view of an electrical module according to certain embodiments of the present invention.

DETAILED DESCRIPTION

Figure 1:
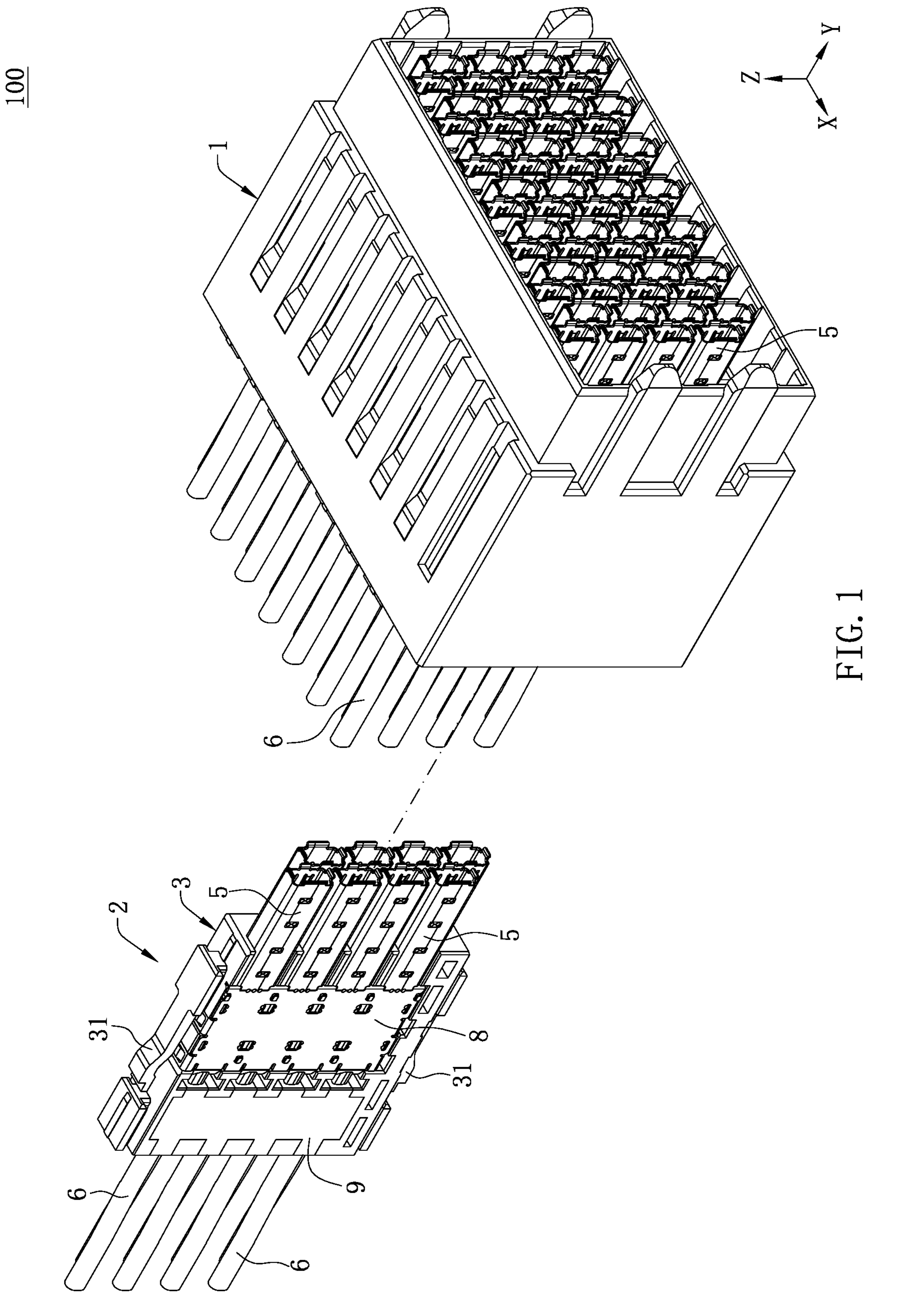
FIG. 1 is a partial disassembled view of an electrical connector according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-12. In accordance with the purposes of this invention, as embodied and broadly described herein, this invention, in one aspect, relates to an electrical connector.

To better understand the technical solutions of the present invention, in the three-dimensional coordinates of the accompanying drawings, the Z-axis is defined as a first direction, the X-axis is defined as a second direction, the Y-axis is defined as a third direction, and any two of the X-axis, the Y-axis and the Z-axis are perpendicular to each other.

Figure 2:
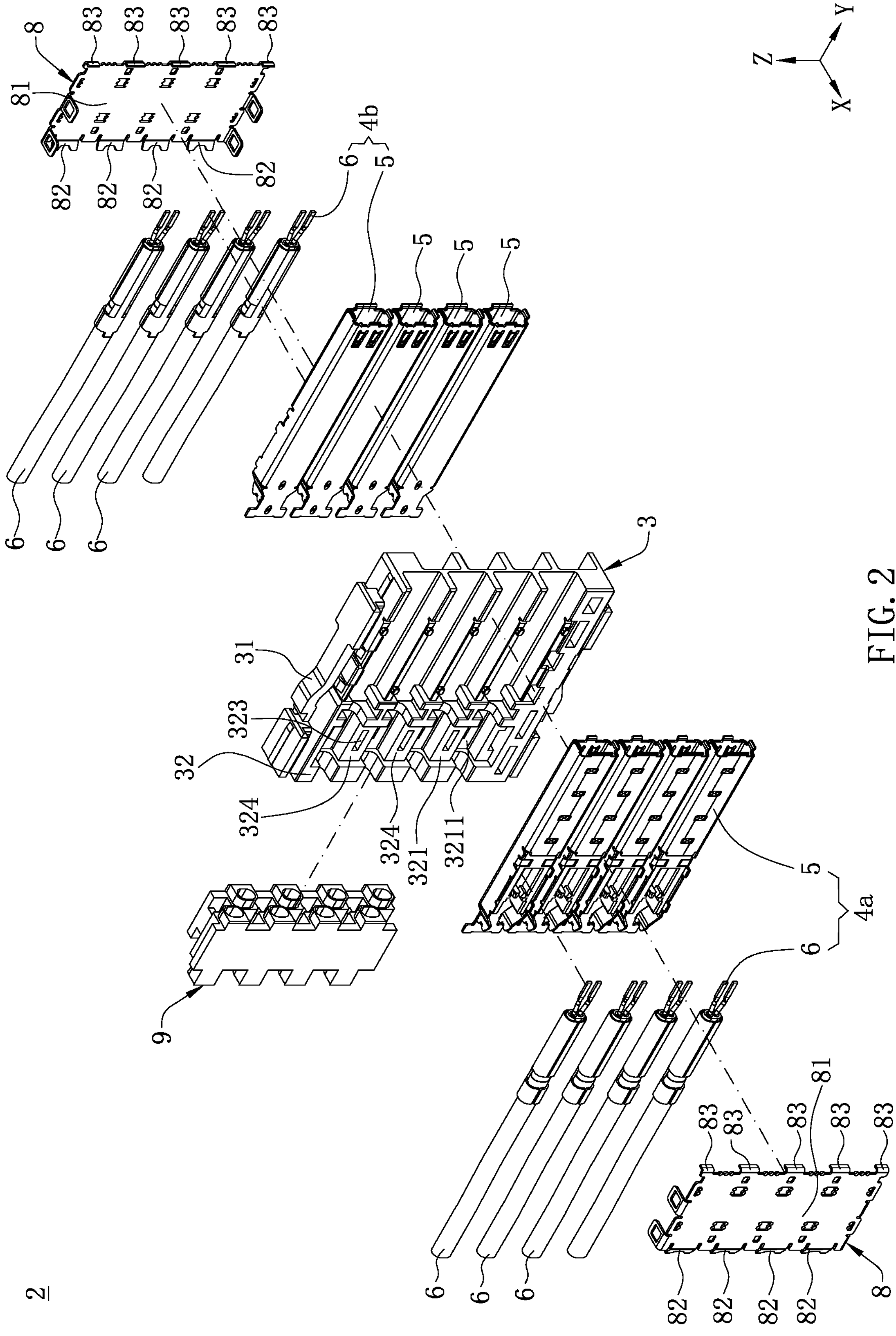
FIG. 2 is a perspective exploded view of an electrical module viewing from one angle according to certain embodiments of the present invention.
Figure 3:
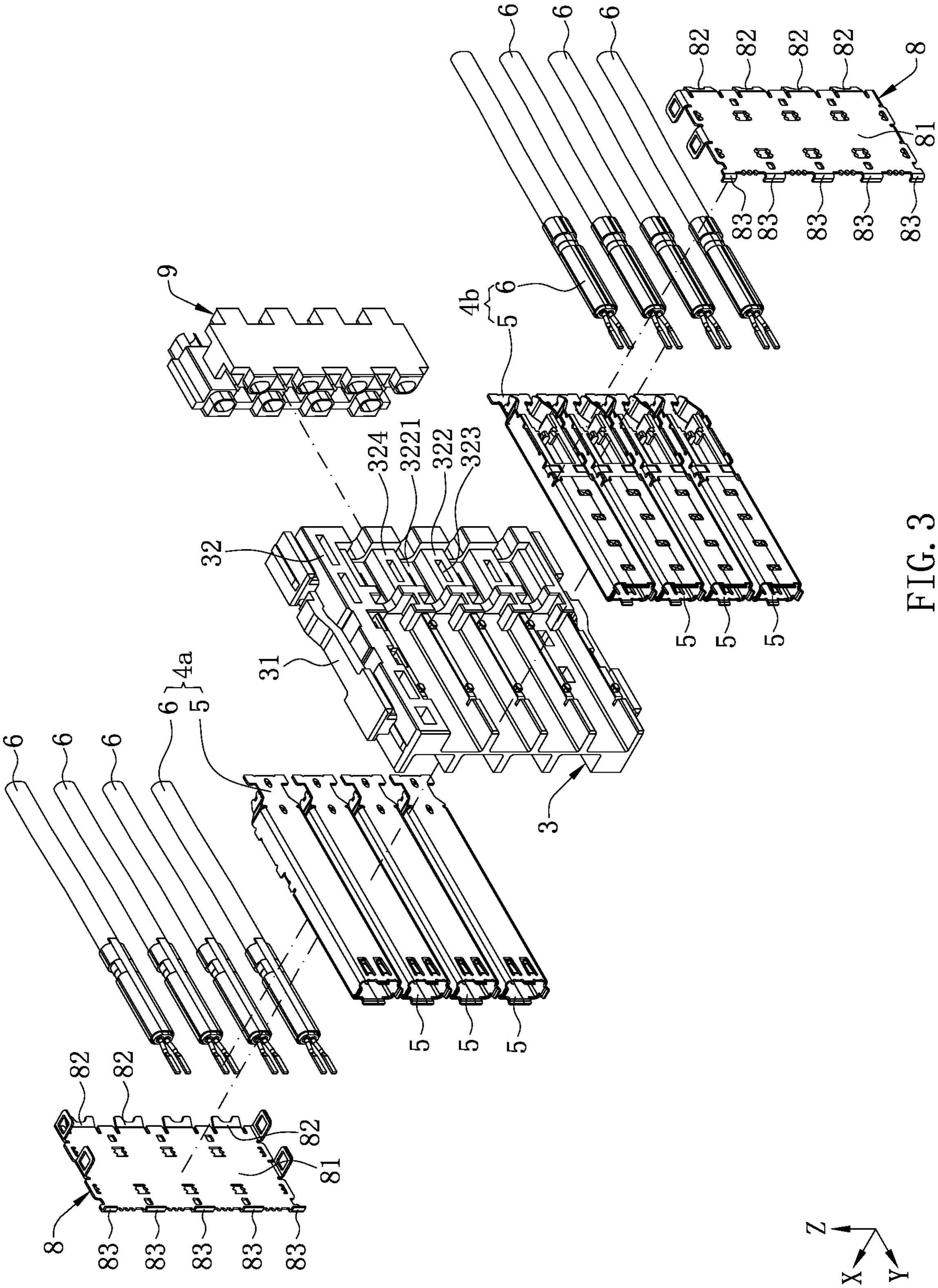
FIG. 3 is a perspective exploded view of an electrical module viewing from another angle according to certain embodiments of the present invention.
Figure 5:
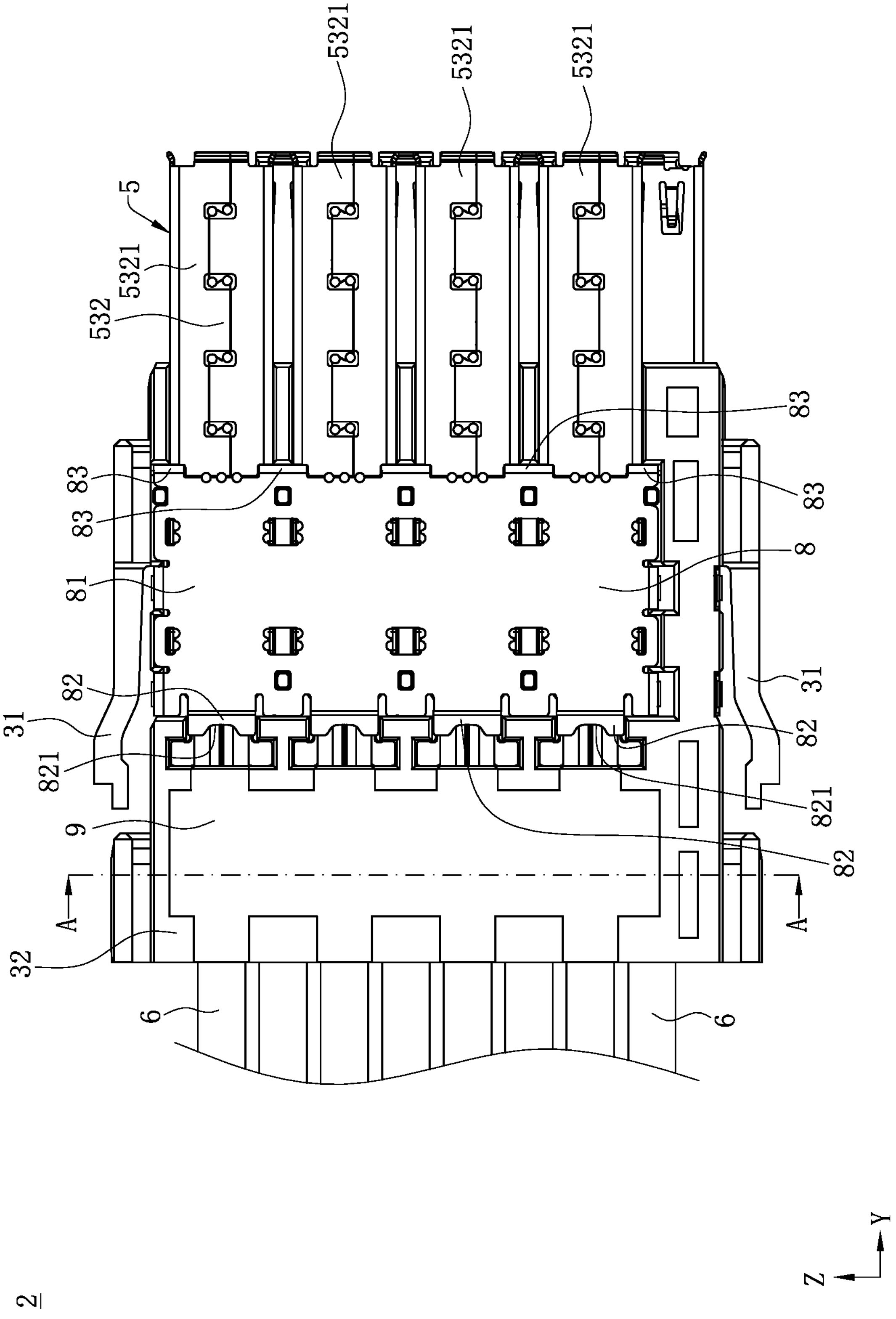
FIG. 5 is a plain view of an electrical module viewing along the X-axis according to certain embodiments of the present invention.

FIG. 1 to FIG. 3 show an electrical connector 100 according to certain embodiments of the present invention. The electrical connector 100 includes a plurality of electrical modules 2 arranged along the second direction X and an insulating shell 1 accommodating and fixing the electrical modules 2. Each electrical module 2 includes an insulating body 3 and a plurality of transmission modules fixed to the insulating body 3. The transmission modules include a plurality of first transmission modules 4*a* arranged in a first row along the first direction Z and a plurality of second transmission modules 4*b* arranged in a second row along the first direction Z. The first row and the second row are parallel along the second direction X. Two sides of the insulating body 3 are provided with two elastic arms 31. The electrical module 2 may be fixed to the insulating shell 1 through the elastic arms 31, and the electrical module 2 may be flexibly retrieved from the insulating body 3 by pressing the elastic arms 31, thus allowing convenient replacement of the electrical module 2. The electrical module 2 further includes two conductive sheets 8 to be connected to the first transmission modules 4*a* in the first row and the second transmission modules 4*b* in the second row respectively. The electrical connector 100 is mated with a mating connector along the third direction Y. One end of a conductor of the mating connector is mated with a terminal 51 of the electrical connector 100, and the other end of the conductor of the mating connector may be connected to a circuit board or a cable. In the present embodiment, the first transmission modules 4*a* in the first row and the second transmission modules 4*b* in the second row are staggered to each other, and do not face right toward each other along the second direction X, such that the projections of the terminals 51 in the first row and the second row along the second direction X are completely staggered, thereby reducing the crosstalk between the terminals in two adjacent rows.

Referring to FIG. 2 to FIG. 6, the insulating body 3 is provided with an extending portion 32 fixing the cable assemblies 6. The extending portion 32 is provided with a first filling space 321 at a location corresponding to the cable assemblies 6 of the first transmission modules 4*a*, and the extending portion 32 is provided with a second filling space 322 at a location corresponding to the cable assemblies 6 of the second transmission modules 4*b*. The extending portion 32 is further provided with a plurality of holes 323 in communication with the first filling space 321 and the second filling space 322. The electrical module 2 further includes an insulating material 9 being integrally formed and filled in the first filling space 321, the holes 323 and the second filling space 322, and the insulating material 9 and the extending portion 32 collectively fix the cable assemblies 6 in the first row and the second row. Thus, the swing of the cable assemblies 6 may be reduced, thus avoiding the cable assemblies 6 from being in ill contact with the corresponding terminal assemblies 5 or lifting up the conductive sheet 8 due to the swing of the cable assemblies 6. Meanwhile, the cable assemblies 6 in the two rows may be fixed together through the insulating material 9, allowing the cable assemblies 6 in the two rows to hold each other up, such that the location stability of the cable assemblies 6 in the two rows is better. Further, compared to the case where the cable assemblies 6 in the two rows are fixed twice through insulating materials 9, the present embodiment may further reduce the forming steps of the electrical connector 100, thus facilitating simplifying the production operation. The holes 323 are used for the insulating material 9 to flow from one side of the extending portion 32 toward the other side thereof in the process of forming the insulating material 9. The first filling space 321 includes a plurality of first slots 3211 accommodating the cable assemblies 6 in the first row, and the second filling space 322 includes a plurality of second slots 3221 accommodating the cable assemblies 6 in the second row. The extending portion 32 is provided with separation portions 324 between two adjacent ones of the first slots 3211 and between two adjacent ones of the second slots 3221. Projections of the first slots 3211 and the second slots 3221 along the second direction X are staggered to each other, and the holes 323 are located on the separation portions 324 and runs through the separation portions 324. Compared to the case where the first slots 3211 and the second slots 3221 are aligned along the second direction X, the separation portions 324 at the two sides of the insulating body 3 are aligned, and the quantity of the holes 323 are relatively few, the present embodiment allows the separation portions 324 at the two sides of the insulating body 3 to be staggered, and the extending portion 32 may be provided with more holes 323, allowing the insulating material 9 to fill therein rapidly. Further, a thinner portion of the material at one side of the insulating material 9 is held by a thicker portion of the material at the other side thereof, allowing the material strength of the insulating material 9 at each location along the first direction Z to be balanced, and preventing the insulating material 9 from breaking at locations thereof with a weaker material strength due to the swing of the cable assemblies 6. Optionally, the insulating material 9 may be a hot-melt adhesive material, which has good fluidity, facilitating completely filling in the space of the first filling space 321 and the second filling space 322.

Figure 6:
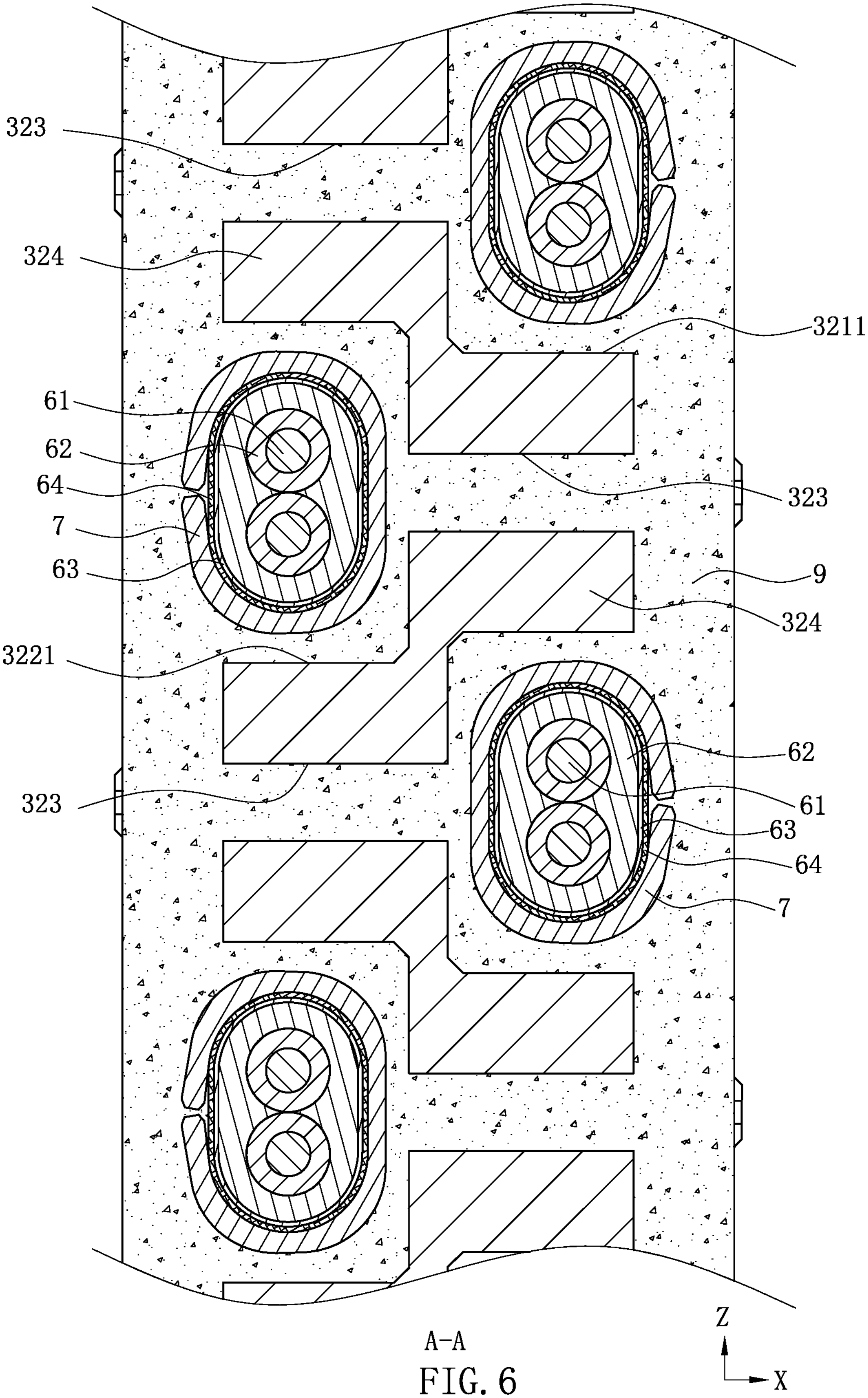
FIG. 6 is a sectional view of FIG. 5 along a line A-A.
Figure 7:
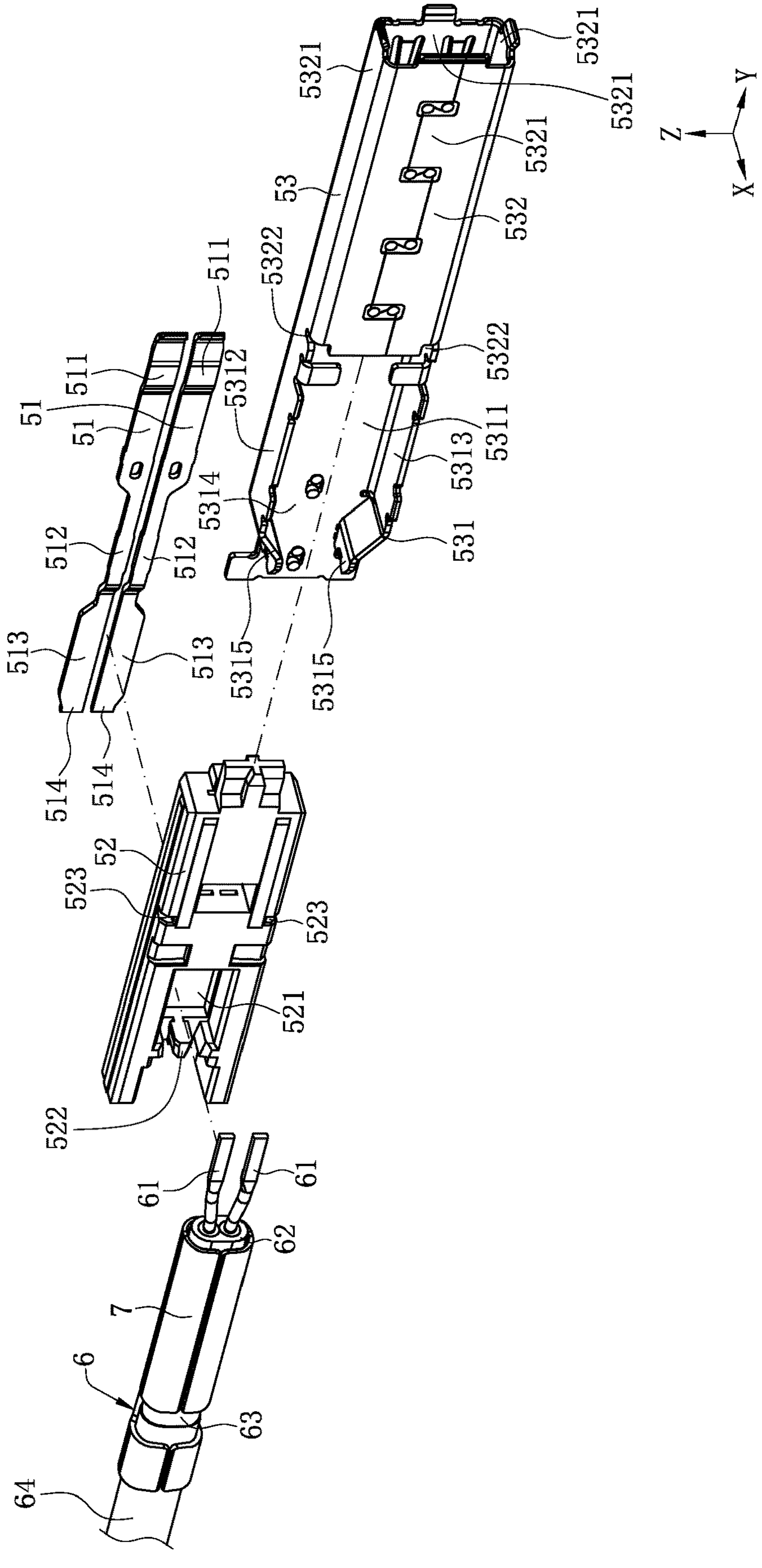
FIG. 7 is a perspective exploded view of a transmission module according to certain embodiments of the present invention.

Referring to FIG. 6 and FIG. 7, each transmission module includes a terminal assembly 5 fixed to the insulating body 3 and a cable assembly 6 connected to the terminal assembly 5. The terminal assembly 5 includes two terminals 51 arranged side-by-side, an insulating block 52 fixing the two terminals 51, and a shielding shell 53 surrounding outside the two terminals 51. The insulating block 52 insulates and isolates the two terminals 51 and the shielding shell 53. The cable assembly 6 includes two wires 61, an insulating layer 62 covering outside the wires 61, a shielding layer 63 covering outside the insulating layer 62, and an insulating outer sleeve 64 located outside the shielding layer 63. The two wires 61 of each cable assembly 6 are connected to the two terminals 61 of a corresponding transmission module.

Figure 8:
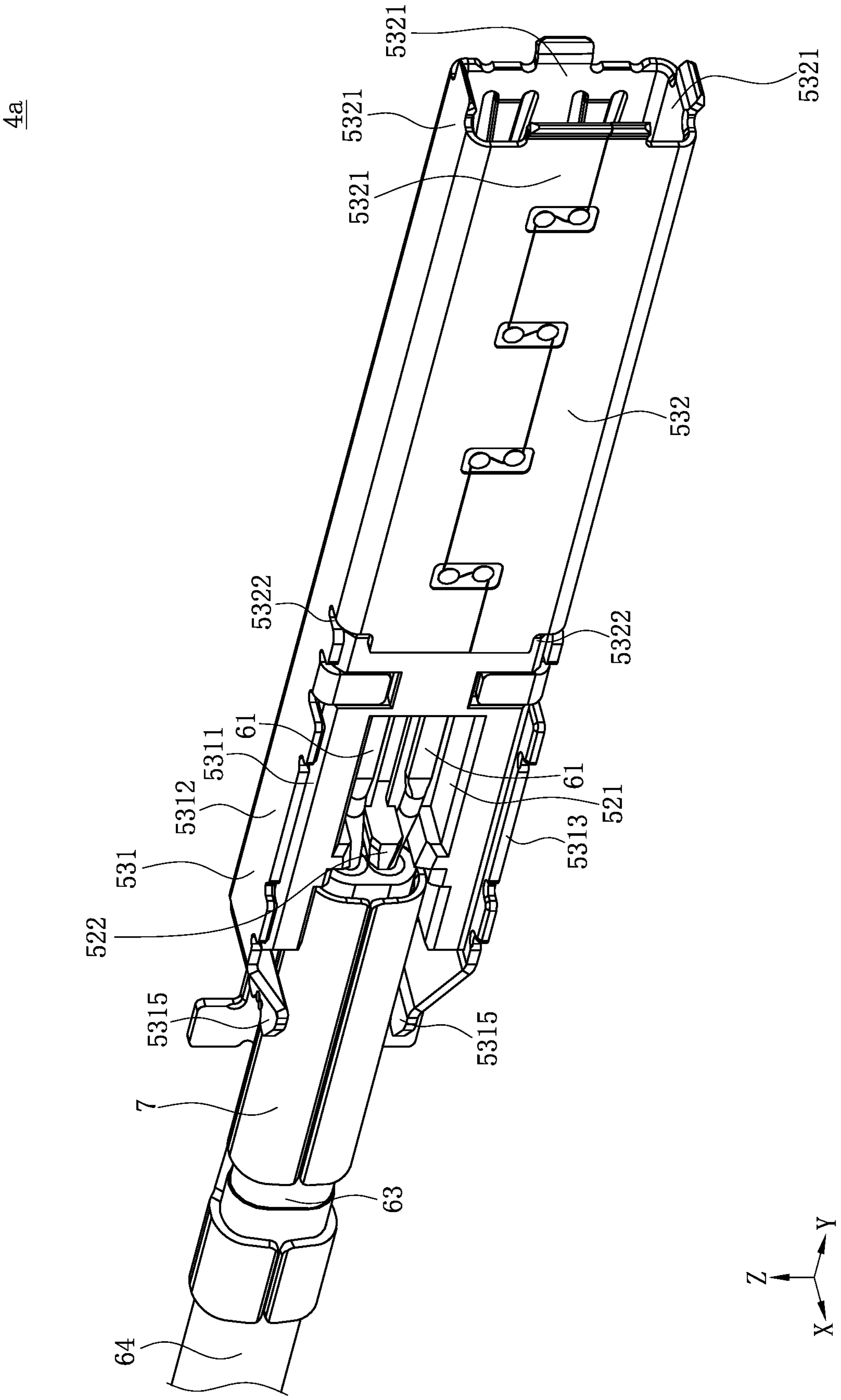
FIG. 8 is a perspective assembled view of a transmission module according to certain embodiments of the present invention.
Figure 9:
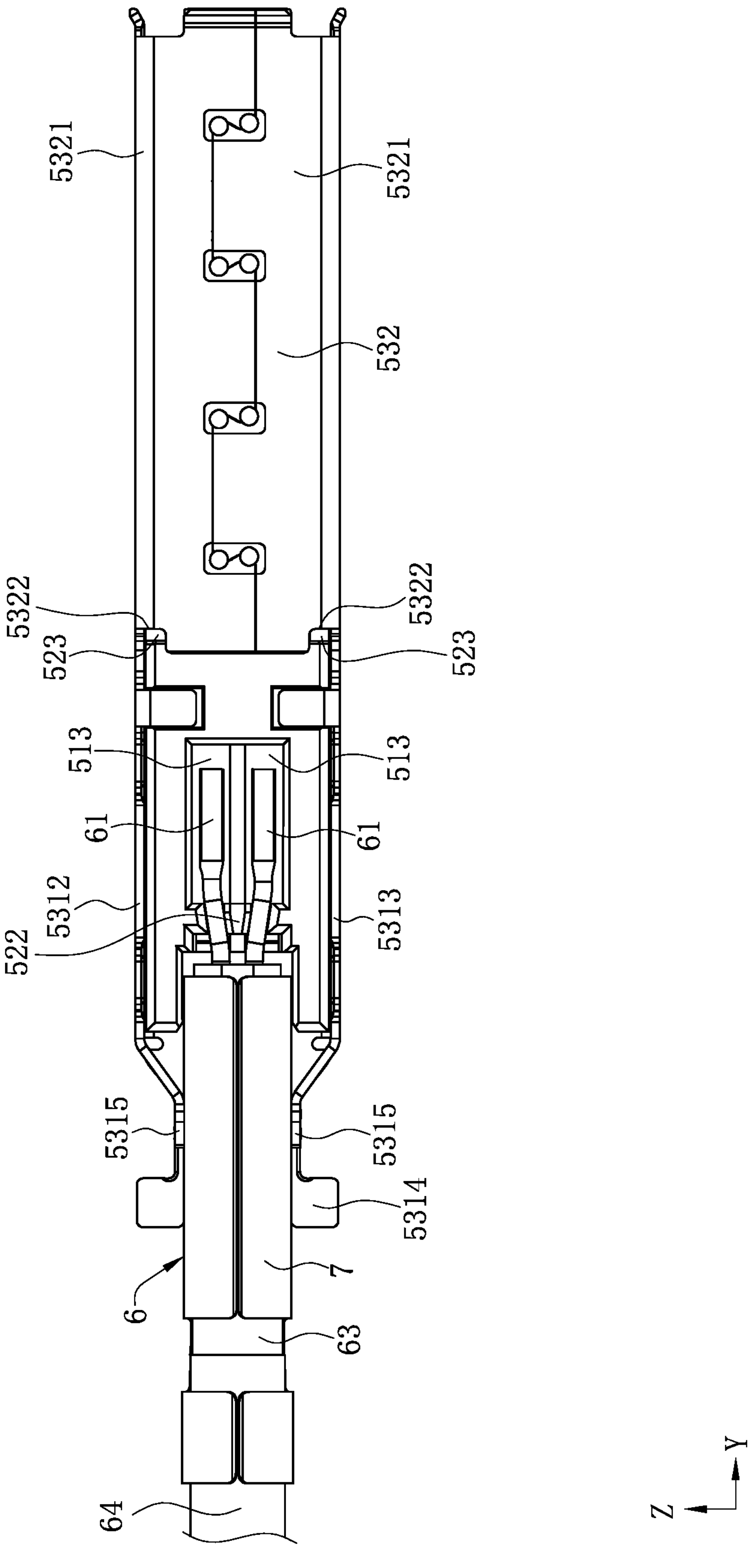
FIG. 9 is a plain view of a transmission module viewing along the X-axis according to certain embodiments of the present invention.

Referring to FIG. 7 to FIG. 9, for each transmission module, each terminal 51 has a contact portion 511, a wire connecting portion 513 and an intermediate portion 512 connecting the contact portion 511 and the wire connecting portion 513. The contact portion 511 is used to mate with a conductor of the mating connector, and the wire connecting portion 513 is used to be connected to a wire 61 of a corresponding cable assembly 6. The insulating block 52 is provided with an air slot 521 at locations of the wire connecting portions 513, and the wire connecting portions 513 of the two terminals 51 are isolated from each other through air. Since the locations of the wire connecting portions 513 overlay with the thicknesses of the wires, the thicknesses of the locations are increased, such that the impedances at the locations are reduced. Compared to the case where the whole structure is completely wrapped by the insulating block, in the present embodiment, the air contact area of the wire connecting portions 513 may be increased by the air slot 521, thus increasing the impedances of the locations, facilitating consistent impedance at various locations of the terminals 51, reducing the signal reflection caused by the inconsistent characteristics impedances of the terminals 51, and reducing the signal loss. Further, each terminal 51 further includes a tail portion 514 extending from the wire connecting portion 513, and the tail portion 514 is fixed to the insulating block 52. The insulating block 52 is further provided with an isolation block 522, and the isolation block 522 is located between the two tail portions 514 of the two terminals 51 and is located between the two wires 61 connected to the two terminals 51 of the terminal assembly 5. Thus, through the isolation block 522, the two tail portions 514 may be isolated and positioned, and the two wires 61 may be isolated and positioned, thus preventing the two wires 61 from being in contact with each other. Meanwhile, it is convenient to perform pre-positioning to the wires 61 prior to connecting the wires 61 and the wire connecting portions 613, thus preventing the connecting operation. Optionally, the wires 61 and the wire connecting portions 513 are connected through soldering.

Referring to FIG. 7 and FIG. 9 to FIG. 11, the shielding shell 53 includes a first shielding portion 531 provided outside the two wire connecting portions 513 of the two terminals 51, and the first shielding portion 531 is provided with an open area 5311 exposing the two wire connecting portions 513. The conductive sheet 8 is electrically connected to the shielding shells 53 of the terminal assemblies 5 in the same row, and shields the open areas 5311 of the shielding shells 53 in the same row. The first shielding portion 531 of each shielding shell 53 and the conductive sheet 8 collectively form a shielding space and are surroundingly provided outside the two corresponding wire connecting portions 513 of the two terminals 51. During the signal transmission process, since the wire connecting portions 513 and the wires 61 are connected to each other, compared to the intermediate portion 512, the electromagnetic field around the wire connecting portion 513 will be denser, and receives the interference signals more easily. In the present invention, the open areas 5311 allow the wires 61 to be connected to the wire connecting portions 513, and the conductive sheet 8 shields the open areas 5311, thus preventing outer interference signals from transmitting to the wire connecting portions 513 through the open areas 5311, and shielding the interference signals for the wire connecting portions 513 through the shielding space. Further, the conductive sheet 8 connects the shielding shells 53 in the same row to form an integral grounding structure, such that electrical potentials of the conductive sheet 8 and the shielding shells 53 are equal, thus reducing the signal crosstalk, and the grounding current paths are increased, which may transmit the interference signals received out rapidly, thus enhancing the shielding grounding effect. Further, compared to the case where the shielding space is surroundingly formed by assembling two separate portions of the first shielding portion 531, and then connecting the shielding shells 53 through the conductive sheet 8, the present invention does not require forming the shielding space by assembling two separate portions of the first shielding portion 531, thus fully utilizing the shielding area of the conductive sheet 8, and reducing the material usage of the shielding shells 53, thereby reducing the cost of the electrical connector 100. Moreover, the shielding shell 53 further includes a second shielding portion 532 integrally connected to the first shielding portion 531. The second shielding portion 532 includes four side walls 5321 and is surroundingly provided at outer sides of the contact portions 511 of the two terminals 51, and the conductive sheet 8 is limited by at least one of the side walls 5321 of the second shielding portion 532 along an extending direction of the contact portion 511. Thus, the terminals 51 may be provided with shielding in a longer range through the first shielding portion 531 and the second shielding portion 532, and compared to the case where the first shielding portion 531 and the second shielding portion 532 are separate structures, in the present embodiment, the first shielding portion 531 and the second shielding portion 532 adopt integrally connected structures, thus simplifying the assembling steps, preventing from unnecessary gaps at linking locations between the separate structures, and reducing the outer interference to the terminals 51. Further, the conductive sheet 8 is limited to the side walls 5321 of the second shielding portion 532, thus preventing from relative movement between the conductive sheet 8 and the shielding shells 53, and ensuring the contact between the shielding shells 53 and the conductive sheet 8. Specifically, referring to FIG. 7, FIG. 9 and FIG. 10, in the present embodiment, the insulating block 52 is provided with two first position limiting slots 523, the shielding shell 53 is provided with two second position limiting slots 5322, and each second position limiting slot 5322 corresponds to a location of a corresponding first position limiting slot 523 and exposes the corresponding first position limiting slot 523. The conductive sheet 8 is provided with a main body portion 81 and a plurality of position limiting portions 83 extending from the main body portion 81. The main body portion 81 shields the open areas 5311 of the shielding shells 53 in the same row, and each position limiting portion 83 enters a corresponding second position limiting slot 5322 of at least one of the shielding shells 53 and a first position limiting slot 523 corresponding to the second position limiting slot 5322. In the present embodiment, some of the position limiting portions 83 are located between two shielding shells 53 along the first direction Z, and these position limiting portions 83 are limited in the second position limiting slots 5322 of the two shielding shells 53 and the two corresponding first position limiting slots 523 corresponding to the two second position limiting slots 5322. Some other position limiting portions 83 are limited only in the second position limiting slot 5322 of one shielding shell 53 and a corresponding first position limiting slot 523 corresponding to the second position limiting slot 5322. Thus, the position limiting portions 83 may be limited by the first position limiting slots 523 and the second position limiting slots 5322, thus preventing the conductive sheet 8 and the shielding shells 53 from being separate from each other. Further, in the present embodiment, the second position limiting slots 5322 are provided between two side walls 5321 perpendicular to each other, and are provided at linking locations between the second shielding portion 532 and the open area 5311, thus allowing the second position limiting slots 5322 to implement transition at the linking locations, facilitating bending and forming the two side walls 5321 of the second shielding portion 532 perpendicular to each other, and preventing the two side walls 5321 of the second shielding portion 532 perpendicular to each other from tearing at the linking locations.

Figure 10:
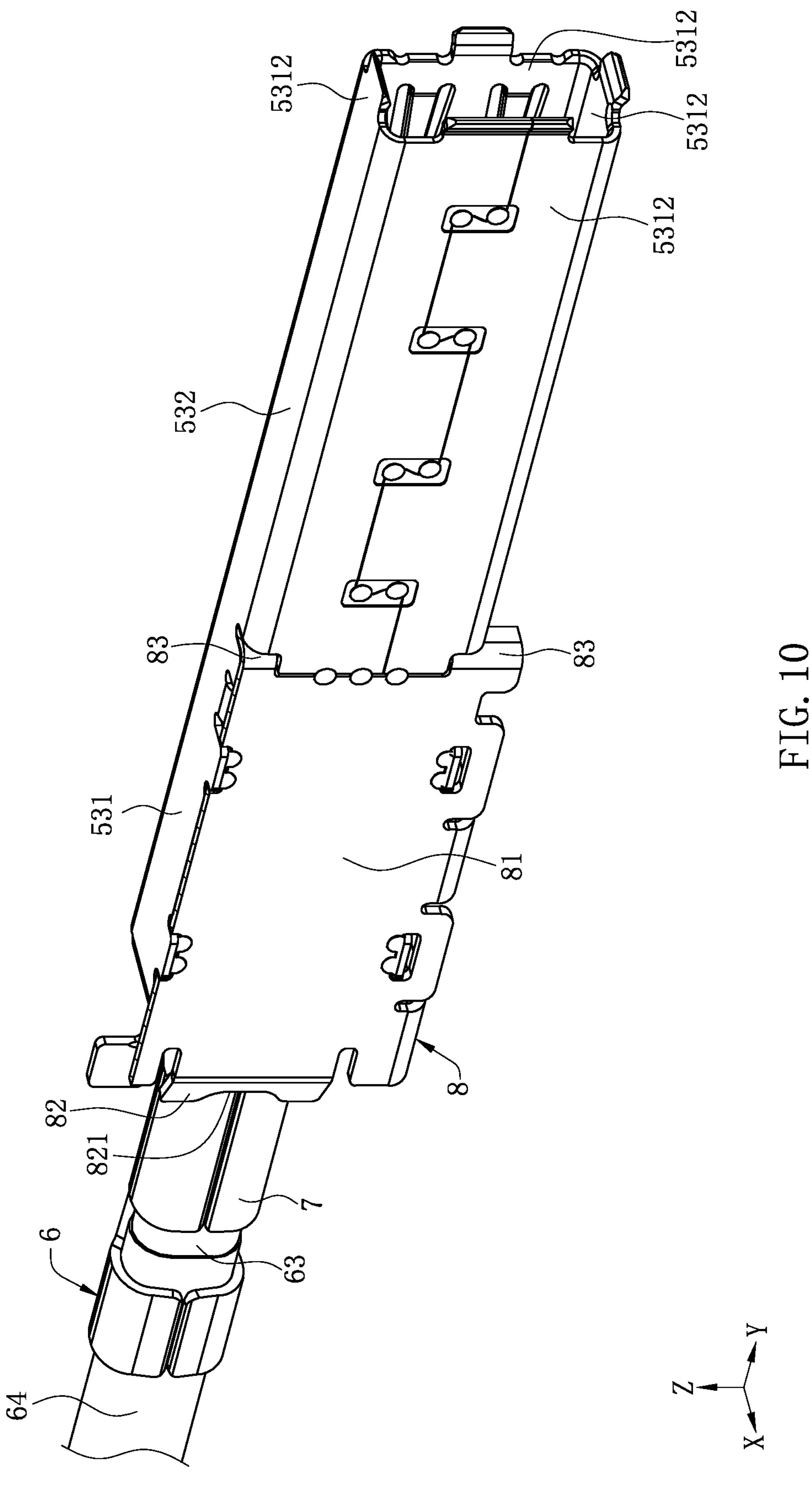
FIG. 10 is a partial perspective view of a transmission module and a conductive sheet after being assembled according to certain embodiments of the present invention.
Figure 11:
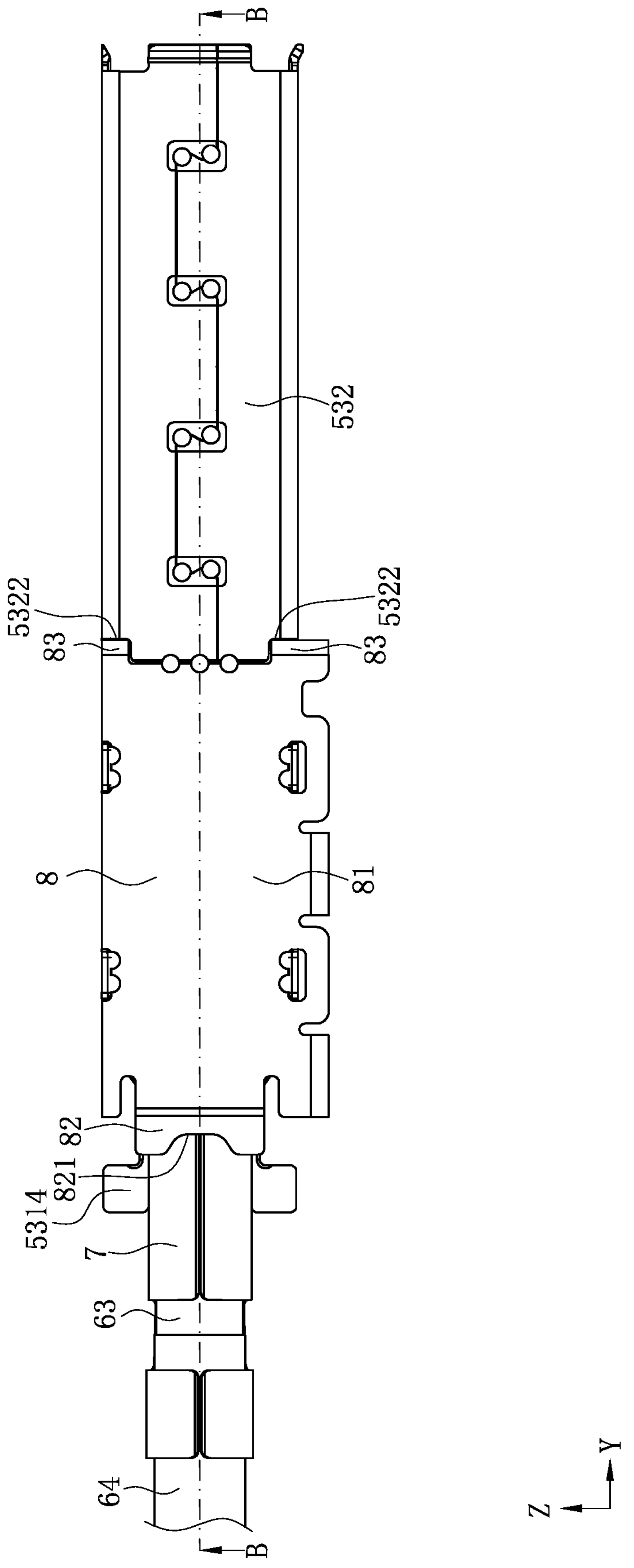
FIG. 11 is a partial plain view of a transmission module and a conductive sheet after being assembled viewing along the X-axis according to certain embodiments of the present invention.
Figure 12:
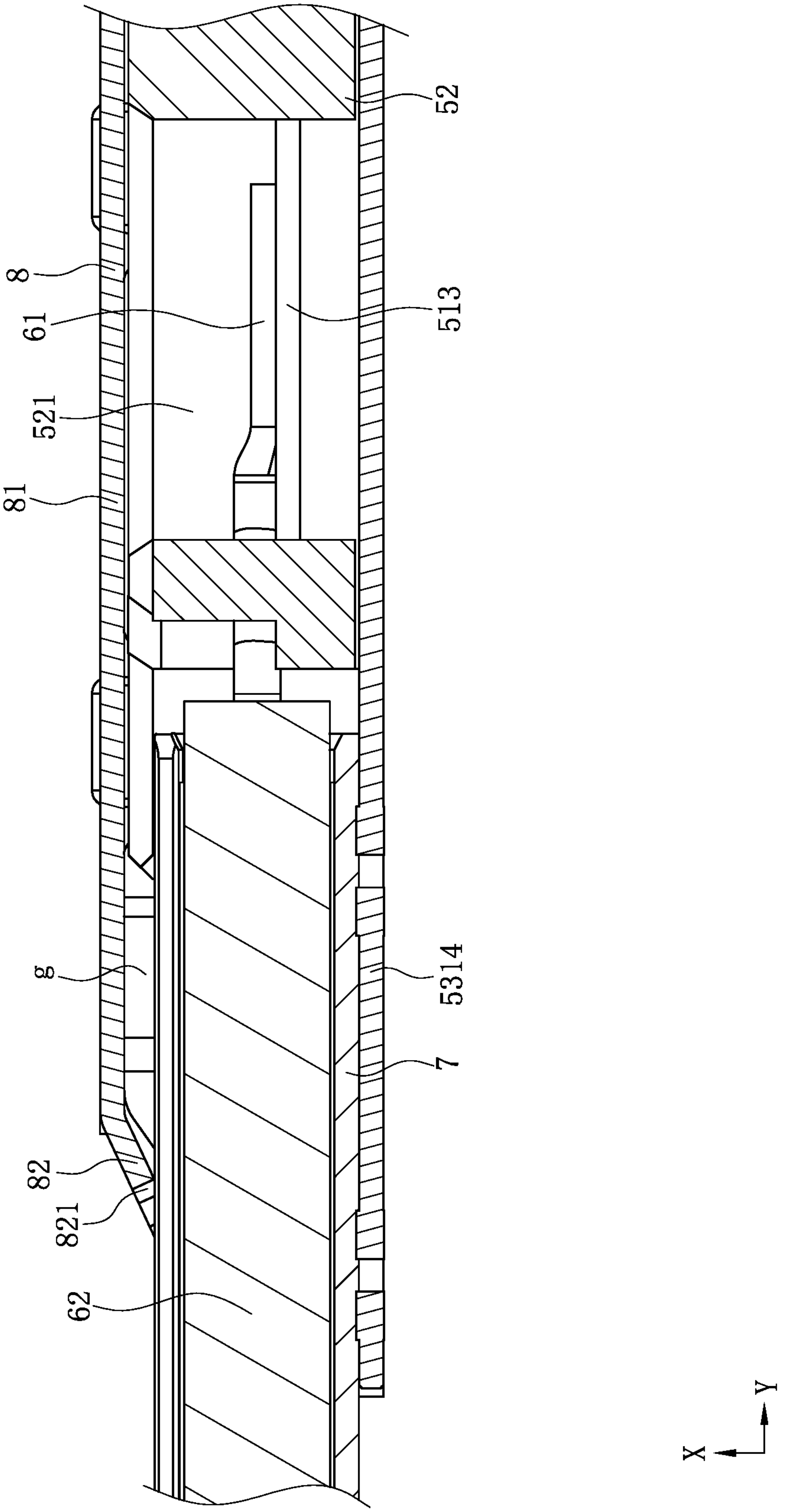
FIG. 12 is a sectional view of FIG. 11 along a line B-B.

Referring to FIG. 7, FIG. 9 and FIG. 10, each cable assembly 6 further includes a grounding ring 7, and the grounding ring 7 is sleeved on and in contact with the shielding layer 63 of the corresponding cable assembly 6. The first shielding portion 531 extends to be in contact with the grounding ring 7, and the shielding space is surroundingly provided outside the wire connecting portion 513 and outside a portion of the grounding ring 7. Thus, the shielding layer 63, the grounding ring 7, the shielding shell 53 and the conductive sheet 8 are connected to form an integral grounding structure, thus enhancing the shielding effect and the grounding effect of the electrical connector 100. The first shielding portion 531 extends to the grounding ring 7, such that the first shielding portion 531, the grounding ring 7 and the shielding layer 63 form a continuous shielding structure, such that even the wires 61 exposed toward outer environment may be located in the shielding space, thus preventing the outer interference signals from interfering with the electrical connector 100 through the exposed wires 61. Further, as shown in FIG. 9 to FIG. 12, the first shielding portion 531 includes a first wall 5312 and a second wall 5313 provided opposite to each other and a third wall 5314 connected between the first wall 5312 and the second wall 5313. The third wall 5314 and the open area 5311 are provided opposite to each other. Each of the first wall 5312 and the second wall 5313 is provided with a shielding contact arm 5315, and the shielding contact arm 5315 bends and extends toward the grounding ring 7 and is in contact with the grounding ring 7. The third wall 5314 is in contact with the grounding ring 7, and a portion of the conductive sheet 8 is in contact with the grounding ring 7. Thus, the two shielding contact arms 5315 of the first shielding portion 531 bend and extend toward the grounding ring 7, so an opening of the shielding space at the end adjacent to the grounding ring 7 is gradually reduced, thus reducing the probability of the outer interference signals entering the shielding space from the opening, and reducing the crosstalk interference. The contact locations of the grounding ring 7 with the conductive sheet 8 and the first shielding portion 531 are increased, thus ensuring the connections between the shielding layer 63, the grounding ring 7, the shielding shell 53 and the conductive sheet 8. Further, position limiting to the grounding ring 7 may be performed altogether by the two shielding contact arms 5315, the third wall 5314 and the conductive sheet 8, thus reducing the swing of the cable assembly 6, and reducing the probability of the ill contact between the cable assembly 6 and the terminal assembly 5. As shown in FIG. 7, an edge of the shielding contact arm 5315 is connected to the third wall 5314, thus preventing the shielding contact arm 5315 from being separated from the third wall 5314 when bending and extending and increasing the gaps of the first shielding portion 531, and reducing the crosstalk. Moreover, as shown in FIG. 11 and FIG. 12, the conductive sheet 8 further includes a plurality of abutting portions 82 extending toward the grounding rings 7 in the same row from the main body portion 81. An air gap g exists between the main body portion 81 and the grounding ring 7. A tail end of each abutting portion 82 extends obliquely and is in contact with the corresponding grounding ring 7. A middle portion of the tail end of each abutting portion 82 is provided with a recess 821, and a maximum width of the recess 821 is less than a width of the grounding ring 7. The air gap g provides a certain reserved amount for the thickness parameter adjustment or the thickness variation of the grounding ring 7 caused by deformation, thus facilitating selecting grounding rings 7 with different thickness parameters based on the need, or preventing the grounding ring 7 from deformation and hindering the stable connection of the conductive sheet 8 to the insulating body 3. If the abutting portions 82 extend perpendicularly from the main body portion 71, and the recess 821 crosses the whole width of the grounding ring 7, the material of each abutting portion 82 located at two sides of the recess 821 may excessively occupy a relatively large space, thus causing the whole electrical connector 100 to have a relatively large size along the width direction of the grounding ring 7 once the width of the abutting portion 82 is added onto the width of the grounding ring 7. Further, when there is an error in the sizes of the recess 821 or the grounding ring 7, ill contact may exist between the abutting portions 82 and the grounding ring 7. In the present embodiment, the tail end of each abutting portion 82 extends obliquely, allowing the oblique angle to be flexibly adjusted by the acting force between the grounding ring 7 and the abutting portion 82, and ensuring the grounding ring 7 to be in contact with the abutting portion 82. Further, the width of the recess 821 is less than the width of the grounding ring 7, such that the recess 821 is only reserved for a portion of the grounding ring 7, and the material of each abutting portion 82 at the two sides of the recess 821 and the grounding ring 7 will overlap in the width direction, thus reducing the size of the electrical connector 100 in the width direction of the grounding ring 7. Further, the tail end of each abutting portion 82 extends obliquely and is in contact with the grounding ring 7, and the opening of the shielding space adjacent to the grounding ring 7 may be further reduced, thus reducing the gap of the shielding space in communication with the outer environment, reducing the probability of the outer interference signals entering the shielding space from the opening, and reducing the crosstalk interference. It should be noted that, in the present embodiment, the grounding ring 7 and the conductive sheet 8 are in contact along the second direction X, and the size of the grounding ring 7 along the second direction X serves as the thickness of the grounding ring 7. It should be noted that, in the present embodiment, the two terminals 51 of the terminal assembly 5 are arranged side-by-side along the first direction Z, and the size of the grounding ring 7 along the first direction Z serves as the width of the grounding ring 7.

It should be noted that, the transmission modules of one electrical module 2 may be arranged in only one row or in more than two rows, and the present invention is not limited to the case of the present embodiment where the transmission modules are arranged in the first row and the second row. Further, one electrical module 2 is not limited to include two conductive sheets 8, and may include one conductive sheet 8 or more than two conductive sheets 8. In other embodiments, the quantity of the side walls 5321 of the second shielding portion 532 may be other quantities, such as two or three side walls 5321, and one or more of the side walls 5321 of the second shielding portion 532 may be provided with openings based on actual need, which is not hereinafter limited. The insulating layer 62 of the cable assembly 6 may be formed by one layer or at least two layers of related materials. The two terminals 51 of the terminal assembly 5 may be arranged side-by-side along the first direction Z, and may be arranged side-by-side along the second direction X, which is not hereinafter limited. It should be noted that, the two terminals 51 in each terminal assembly 5 of the electrical connector 100 forms a pair of terminals 51. Some of the pairs of terminals 51 may transmit power signals, and some other pairs of terminals 51 may function as differential pairs to transmit differential signals, and the actual position arrangement of the pairs of terminal 51 with different signal configurations may be configured according to actual need.

In sum, the electrical connector 100 according to certain embodiments of the present invention has the following beneficial effects:

1. The present invention prevents outer interference signals from transmitting to the wire connecting portions 513 through the open areas 5311, and shielding the interference signals for the wire connecting portions 513 through the shielding space. Further, the conductive sheet 8 connects the shielding shells 53 in the same row to form an integral grounding structure, such that electrical potentials of the conductive sheet 8 and the shielding shells 53 are equal, thus reducing the signal crosstalk, and the grounding current paths are increased, which may transmit the interference signals received out rapidly, thus enhancing the shielding grounding effect.

2. The air contact area of the wire connecting portions 513 may be increased by the air slot 521, thus increasing the impedances of the locations, facilitating consistent impedance at various locations of the terminals 51, reducing the signal reflection caused by the inconsistent characteristics impedances of the terminals 51, and reducing the signal loss.

3. In the present embodiment, the first shielding portion 531 and the second shielding portion 532 adopt integrally connected structures, thus simplifying the assembling steps, preventing from unnecessary gaps at linking locations between the separate structures, and reducing the outer interference to the terminals 51. Further, the conductive sheet 8 is limited to the side walls 5321 of the second shielding portion 532, thus preventing from relative movement between the conductive sheet 8 and the shielding shells 53, and ensuring the contact between the shielding shells 53 and the conductive sheet 8.

4. The first shielding portion 531 extends to the grounding ring 7, such that the first shielding portion 531, the grounding ring 7 and the shielding layer 63 form a continuous shielding structure, such that even the wires 61 exposed toward outer environment may be located in the shielding space, thus preventing the outer interference signals from interfering with the electrical connector 100 through the exposed wires 61.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, comprising at least one electrical module, wherein the electrical module comprises:

an insulating body;

a plurality of transmission modules, arranged in at least one row along a first direction, wherein each of the transmission modules comprises a terminal assembly fixed to the insulating body and a cable assembly connected to the terminal assembly, the terminal assembly comprises two terminals arranged side-by-side and a shielding shell surrounding outside the two terminals, the shielding shell and the two terminals are electrically isolated, each of the terminals has a contact portion configured to mate with a mating connector, a wire connecting portion configured to be connected to a wire of the corresponding cable assembly and an intermediate portion connecting the contact portion and the wire connecting portion, a first shielding portion of the shielding shell is provided outside the two wire connecting portions of the two terminals, the shielding shell is provided with an open area located on the first shielding portion, and the two wire connecting portions are exposed from the shielding shell through the open area; and a conductive sheet, fixed to the insulating body and electrically connected to the shielding shells of the terminal assemblies of the transmission modules in a same row, wherein the conductive sheet shields the open areas of the shielding shells of the terminal assemblies of the transmission modules in the same row, and the first shielding portion of each of the shielding shells of the terminal assemblies and the conductive sheet collectively form a shielding space and are surroundingly provided outside the two corresponding wire connecting portions of the two terminals;

wherein the shielding shell further comprises a second shielding portion integrally connected to the first shielding portion, the second shielding portion comprises four side walls and is surroundingly provided at outer sides of the contact portions of the two terminals, and the conductive sheet is limited by at least one of the side walls of the second shielding portion along an extending direction of the contact portion.

2. The electrical connector according to claim 1, wherein the terminal assembly of each of the transmission modules further comprises an insulating block fixing the two terminals, the insulating block insulates and isolates the two terminals and the shielding shell, the insulating block is provided with an air slot at locations of the wire connecting portions, and the wire connecting portions of the two terminals are isolated from each other through air.

3. The electrical connector according to claim 2, wherein each of the terminals further comprises a tail portion extending from the wire connecting portion, the insulating block is further provided with an isolation block, and the isolation block is located between the two tail portions of the two terminals of the terminal assembly and is located between the two wires connected to the two terminals of the terminal assembly.

4. The electrical connector according to claim 1, wherein the cable assembly of each of the transmission modules comprises two wires, an insulating layer covering the wires and a shielding layer covering outside the insulating layer, the cable assembly of each of the transmission modules further comprises a grounding ring, and the grounding ring is sleeved on and in contact with the shielding layer of the cable assembly;

wherein the first shielding portion extends to be in contact with the grounding ring, and the shielding space is surroundingly provided outside the wire connecting portion and outside a portion of the grounding ring.

5. The electrical connector according to claim 4, wherein the first shielding portion comprises a first wall and a second wall provided opposite to each other and a third wall connected between the first wall and the second wall, the third wall and the open area are provided opposite to each other, the first wall and the second wall bend and extend toward the grounding ring to form a shielding contact arm in contact with the grounding ring, an edge of the shielding contact arm is connected to the third wall, the third wall is in contact with the grounding ring, and a portion of the conductive sheet is in contact with the grounding ring.

6. The electrical connector according to claim 5, wherein the conductive sheet has a main body portion and a plurality of abutting portions extending toward the grounding rings of the cable assemblies of the transmission modules in the same row from the main body portion, the main body portion shields the open areas of the shielding shells of the terminal assemblies of the transmission modules in the same row, an air gap exists between the main body portion and the grounding ring, a tail end of each of the abutting portions extends obliquely and is in contact with the corresponding grounding ring, a middle portion of the tail end of each of the abutting portions is provided with a recess, and a maximum width of the recess is less than a width of the grounding ring.

7. An electrical connector, comprising at least one electrical module, wherein the electrical module comprises:

an insulating body;

a plurality of transmission modules, arranged in at least one row along a first direction, wherein each of the transmission modules comprises a terminal assembly fixed to the insulating body and a cable assembly connected to the terminal assembly, the terminal assembly comprises two terminals arranged side-by-side and a shielding shell surrounding outside the two terminals, the shielding shell and the two terminals are electrically isolated, each of the terminals has a contact portion configured to mate with a mating connector, a wire connecting portion configured to be connected to a wire of the corresponding cable assembly and an intermediate portion connecting the contact portion and the wire connecting portion, a first shielding portion of the shielding shell is provided outside the two wire connecting portions of the two terminals, and the first shielding portion is provided with an open area located on the first shielding portion, and the two wire connecting portions are exposed from the shielding shell through the open area; and a conductive sheet, fixed to the insulating body and electrically connected to the shielding shells of the terminal assemblies of the transmission modules in a same row, wherein the conductive sheet shields the open areas of the shielding shells of the terminal assemblies of the transmission modules in the same row, and the first shielding portion of each of the shielding shells of the terminal assemblies and the conductive sheet collectively form a shielding space and are surroundingly provided outside the two corresponding wire connecting portions of the two terminals;

wherein the transmission modules comprise a plurality of first transmission modules arranged in a first row along the first direction and a plurality of second transmission modules arranged in a second row along the first direction, and the first row and the second row are parallel along a second direction perpendicular to the first direction;

wherein the insulating body is provided with an extending portion fixing the cable assemblies of the transmission modules, the extending portion is provided with a first filling space at a location corresponding to the cable assemblies of the first transmission modules, the extending portion is provided with a second filling space at a location corresponding to the cable assemblies of the second transmission modules, and the extending portion is further provided with at least one hole in communication with the first filling space and the second filling space; and wherein the electrical module further comprises an insulating material being integrally formed and filled in the first filling space, the hole and the second filling space, and the insulating material and the extending portion collectively fix the cable assemblies of the transmission modules in the first row and the second row.

8. The electrical connector according to claim 7, wherein the first filling space comprises a plurality of first slots accommodating the cable assemblies of the first transmission modules in the first row, the second filling space comprises a plurality of second slots accommodating the cable assemblies of the second transmission modules in the second row, the extending portion is provided with separation portions between two adjacent ones of the first slots and between two adjacent ones of the second slots; and wherein projections of the first slots and the second slots along the second direction are staggered to each other, and the hole is located on the separation portions and runs through the separation portions.

9. The electrical connector according to claim 7, wherein the terminal assembly of each of the transmission modules further comprises an insulating block fixing the two terminals, the insulating block insulates and isolates the two terminals and the shielding shell, the insulating block is provided with an air slot at locations of the wire connecting portions, and the wire connecting portions of the two terminals are isolated from each other through air.

10. The electrical connector according to claim 9, wherein each of the terminals further comprises a tail portion extending from the wire connecting portion, the insulating block is further provided with an isolation block, and the isolation block is located between the two tail portions of the two terminals of the terminal assembly and is located between the two wires connected to the two terminals of the terminal assembly.

11. The electrical connector according to claim 7, wherein the cable assembly of each of the transmission modules comprises two wires, an insulating layer covering the wires and a shielding layer covering outside the insulating layer, the cable assembly of each of the transmission modules further comprises a grounding ring, and the grounding ring is sleeved on and in contact with the shielding layer of the cable assembly;

wherein the first shielding portion extends to be in contact with the grounding ring, and the shielding space is surroundingly provided outside the wire connecting portion and outside a portion of the grounding ring.

12. The electrical connector according to claim 11, wherein the first shielding portion comprises a first wall and a second wall provided opposite to each other and a third wall connected between the first wall and the second wall, the third wall and the open area are provided opposite to each other, the first wall and the second wall bend and extend toward the grounding ring to form a shielding contact arm in contact with the grounding ring, an edge of the shielding contact arm is connected to the third wall, the third wall is in contact with the grounding ring, and a portion of the conductive sheet is in contact with the grounding ring.

13. The electrical connector according to claim 12, wherein the conductive sheet has a main body portion and a plurality of abutting portions extending toward the grounding rings of the cable assemblies of the transmission modules in the same row from the main body portion, the main body portion shields the open areas of the shielding shells of the terminal assemblies of the transmission modules in the same row, an air gap exists between the main body portion and the grounding ring, a tail end of each of the abutting portions extends obliquely and is in contact with the corresponding grounding ring, a middle portion of the tail end of each of the abutting portions is provided with a recess, and a maximum width of the recess is less than a width of the grounding ring.

14. An electrical connector, comprising at least one electrical module, wherein the electrical module comprises:

an insulating body;

a plurality of transmission modules, arranged in at least one row along a first direction, wherein each of the transmission modules comprises a terminal assembly fixed to the insulating body and a cable assembly connected to the terminal assembly, the terminal assembly comprises two terminals arranged side-by-side and a shielding shell surrounding outside the two terminals, the shielding shell and the two terminals are electrically isolated, each of the terminals has a contact portion configured to mate with a mating connector, a wire connecting portion configured to be connected to a wire of the corresponding cable assembly and an intermediate portion connecting the contact portion and the wire connecting portion, a first shielding portion of the shielding shell is provided outside the two wire connecting portions of the two terminals, and the first shielding portion is provided with an open area located on the first shielding portion, and the two wire connecting portions are exposed from the shielding shell through the open area; and a conductive sheet, fixed to the insulating body and electrically connected to the shielding shells of the terminal assemblies of the transmission modules in a same row, wherein the conductive sheet shields the open areas of the shielding shells of the terminal assemblies of the transmission modules in the same row, and the first shielding portion of each of the shielding shells of the terminal assemblies and the conductive sheet collectively form a shielding space and are surroundingly provided outside the two corresponding wire connecting portions of the two terminals;

wherein the terminal assembly of each of the transmission modules further comprises an insulating block fixing the two terminals, the insulating block is located in the shielding shell and insulates and isolates the two terminals and the shielding shell, the insulating block is provided with at least one first position limiting slot, the shielding shell is provided with at least one second position limiting slot, and the second position limiting slot corresponds to a location of a corresponding first position limiting slot of the at least one first position limiting slot and exposes the corresponding first position limiting slot; and wherein the conductive sheet has a main body portion and a plurality of position limiting portions extending from the main body portion, the main body portion shields the open areas of the shielding shells of the terminal assemblies of the transmission modules in the same row, and each of the position limiting portions enters the second position limiting slot of at least one of the shielding shells and the first position limiting slot corresponding to the second position limiting slot.

15. The electrical connector according to claim 14, wherein the terminal assembly of each of the transmission modules further comprises an insulating block fixing the two terminals, the insulating block insulates and isolates the two terminals and the shielding shell, the insulating block is provided with an air slot at locations of the wire connecting portions, and the wire connecting portions of the two terminals are isolated from each other through air.

16. The electrical connector according to claim 15, wherein each of the terminals further comprises a tail portion extending from the wire connecting portion, the insulating block is further provided with an isolation block, and the isolation block is located between the two tail portions of the two terminals of the terminal assembly and is located between the two wires connected to the two terminals of the terminal assembly.

17. The electrical connector according to claim 14, wherein the cable assembly of each of the transmission modules comprises two wires, an insulating layer covering the wires and a shielding layer covering outside the insulating layer, the cable assembly of each of the transmission modules further comprises a grounding ring, and the grounding ring is sleeved on and in contact with the shielding layer of the cable assembly;

wherein the first shielding portion extends to be in contact with the grounding ring, and the shielding space is surroundingly provided outside the wire connecting portion and outside a portion of the grounding ring.

18. The electrical connector according to claim 17, wherein the first shielding portion comprises a first wall and a second wall provided opposite to each other and a third wall connected between the first wall and the second wall, the third wall and the open area are provided opposite to each other, the first wall and the second wall bend and extend toward the grounding ring to form a shielding contact arm in contact with the grounding ring, an edge of the shielding contact arm is connected to the third wall, the third wall is in contact with the grounding ring, and a portion of the conductive sheet is in contact with the grounding ring.

19. The electrical connector according to claim 18, wherein the conductive sheet has a main body portion and a plurality of abutting portions extending toward the grounding rings of the cable assemblies of the transmission modules in the same row from the main body portion, the main body portion shields the open areas of the shielding shells of the terminal assemblies of the transmission modules in the same row, an air gap exists between the main body portion and the grounding ring, a tail end of each of the abutting portions extends obliquely and is in contact with the corresponding grounding ring, a middle portion of the tail end of each of the abutting portions is provided with a recess, and a maximum width of the recess is less than a width of the grounding ring.

* * * * *